(12) United States Patent
Tandy et al.

(10) Patent No.: US 12,365,134 B2
(45) Date of Patent: Jul. 22, 2025

(54) THREE-DIMENSIONAL PRINTING (71) Applicant: PERIDOT PRINT LLC, Palo Alto, CA (US)

(72) Inventors: Jesiska Tandy, San Diego, CA (US); Stanley J. Kozmiski, San Diego, CA (US); Alay Yemane, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 0 days.

(21) Appl. No.: 17/298,919

(22) PCT Filed: Jun. 10, 2019

(86) PCT No.: PCT/IB2019/001321
§ 371 (c)(1),
(2) Date: Jun. 1, 2021

(87) PCT Pub. No.: WO2020/249998
PCT Pub. Date: Dec. 17, 2020

(65) Prior Publication Data
US 2024/0424730 A1 Dec. 26, 2024

(51) Int. Cl.
*B29C 64/165* (2017.01)
*B29K 23/00* (2006.01)
*B29K 75/00* (2006.01)
*B29K 77/00* (2006.01)
*B29K 105/00* (2006.01)
(Continued)

(52) U.S. Cl.
CPC ............ *B29C 64/165* (2017.08); *B33Y 70/10* (2020.01); *B29K 2023/12* (2013.01); *B29K 2075/00* (2013.01); *B29K 2077/00* (2013.01); *B29K 2105/0032* (2013.01); *B29K 2105/12* (2013.01); *B29K 2309/08* (2013.01);
(Continued)

(58) Field of Classification Search
CPC ....... B29C 64/165; B33Y 70/10; B33Y 10/00; B33Y 30/00; B29K 2023/12; B29K 2075/00; B29K 2077/00; B29K 2105/0032; B29K 2105/12; B29K 2309/08
See application file for complete search history.

(56) References Cited

U.S. PATENT DOCUMENTS

2019/0030802 A1* 1/2019 Feng .................. B33Y 70/10
2019/0054690 A1* 2/2019 Feng .................. B33Y 40/10
(Continued)

FOREIGN PATENT DOCUMENTS

CN 105924945 9/2016
CN 106589858 A 4/2017
(Continued)

*Primary Examiner* — Nahida Sultana
(74) *Attorney, Agent, or Firm* — Dierker & Kavanaugh, P.C.

(57) ABSTRACT

A materials kit for three-dimensional (3D) printing can include a powder bed material including from about 60 wt % to 100 wt % composite fibers including glass fibers coated with an encapsulating polymer, wherein the composite fibers have an average length of from about 100 μm to about 700 μm and an average diameter of from about 20 μm to about 70 μm. The materials kit for 3D printing can also include a fusing agent including an energy absorber to absorb electromagnetic radiation to produce heat.

15 Claims, 6 Drawing Sheets

(51) Int. Cl.
    *B29K 105/12*     (2006.01)
    *B29K 309/08*     (2006.01)
    *B33Y 10/00*     (2015.01)
    *B33Y 30/00*     (2015.01)
    *B33Y 70/10*     (2020.01)

(52) U.S. Cl.
    CPC ....... *B29K 2995/0094* (2013.01); *B33Y 10/00* (2014.12); *B33Y 30/00* (2014.12)

(56) References Cited

U.S. PATENT DOCUMENTS

2020/0263023 A1*   8/2020   Kojima .................... C08K 3/30
2020/0369360 A1*  11/2020   Stockett ................... B32B 3/12

FOREIGN PATENT DOCUMENTS

| | | |
|---|---|---|
| CN | 107778846 | 3/2018 |
| CN | 107841134 A | 3/2018 |
| EP | 3208074 B1 | 1/2020 |
| JP | 6472590 B1 | 2/2019 |
| WO | WO-2018072875 | 4/2018 |
| WO | WO-2019069032 | 4/2019 |

* cited by examiner

THREE-DIMENSIONAL PRINTING

BACKGROUND

Methods of three-dimensional (3D) digital printing, a type of additive manufacturing, have continued to be developed over the recent past. However, systems developed for carrying out such methods for 3D printing have historically been expensive, though those expenses have been coming down to more affordable levels recently. In many instances, 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Nevertheless, several commercial sectors such as aviation and the medical industry, to name a few, have benefitted from the ability to rapidly prototype and customize parts.

DETAILED DESCRIPTION

The present disclosure describes materials kits for three-dimensional (3D) printing, methods of making 3D printed articles, and 3D printing systems. In one example, a materials kit for 3D printing can include from about 60 wt % to 100 wt % composite fibers including glass fibers coated with an encapsulating polymer, wherein the composite fibers have an average length of from about 100 μm to about 700 μm and an average diameter of from about 20 μm to about 70 μm, and a fusing agent including an energy absorber to absorb electromagnetic radiation to produce heat. In one example, the composite fibers include glass fibers having an average length from about 50 μm to about 300 μm and an average diameter from about 4 μm to about 20 μm. In another example, the composite fibers have an average aspect ratio from about 3:1 to about 30:1. In yet another example, the composite fibers have a bulk density of from about 0.18 g/cc to about 0.6 g/cc. In still another example, the composite fibers have a melt flow index value of from about 10 to about 80 at a temperature of 235° C. and a load weight of 5 kg. In an additional example, the composite fibers have a volumetric particle size distribution as follows: D10 of from about 25 μm to about 36 μm, D50 of from about 72 μm to about 87 μm, and D90 of from about 170 μm to about 300 μm. In a further example, the glass fibers include an organosilane coupling agent attached to a surface thereof. In a yet further example, the energy absorber comprises a carbon black pigment, a near-infrared absorbing dye, a near-infrared absorbing pigment, a tungsten bronze, a molybdenum bronze, metal nanoparticles, a conjugated polymer, or a combination thereof. In still a further example, the encapsulating polymer can include polyamide-12, polyamide-11, polyamide-6-13, polyamide-6, polypropylene, thermoplastic polyamide, thermoplastic polyurethane, or a combination thereof.

In an additional example, a 3D printing system can include a powder bed material including from about 60 wt % to about 100 wt % composite fibers including glass fibers coated with an encapsulating polymer, wherein the composite fibers have an average length of from about 100 μm to about 700 μm and an average diameter of from about 20 μm to about 70 μm, a fusing agent to eject onto the powder bed material, wherein the fusing agent comprises an energy absorber capable of absorbing electromagnetic radiation to produce heat, and a fusing electromagnetic radiation source to expose the powder bed material to electromagnetic radiation to fuse composite fibers that have been contacted by the fusing agent via ejection, but which does not fuse the composite fibers not contacted by the fusing agent. In some examples, the composite fibers include from about 10 wt % to about 40 wt % glass fibers based on a total weight of the composite fibers.

In an additional example, a method of making a 3D printed article can include iteratively applying individual build material layers to a powder bed support, based on a 3D object model, selectively jetting a fusing agent onto individual build material layers, where the fusing agent includes an energy absorber, and exposing the powder bed to electromagnetic energy to selectively fuse the composite fibers in contact with the energy absorber at individual build material layers to form a 3D printed article. The build material layers can include from about 60 wt % to 100 wt % composite fibers, wherein the composite fibers include glass fibers coated with an encapsulating polymer, the composite fibers having an average length of about 100 μm to about 700 μm and an average diameter of from about 20 μm to about 70 μm. In some examples, the method further includes maintaining the 3D printed article at a temperature of from about 140° C. to about 180° C. for a period of from about 30 minutes to about 72 hours after formation of the 3D printed article. In some additional examples, the method further includes allowing the 3D printed article to cool immediately following formation of the 3D printed article. In still additional examples, the 3D printed article has a tensile strength in the X-Y axis of from about 25 MPa to about 65 MPa, a Young's modulus in the X-Y axis of from about 1600 MPa to about 4500 MPa, and a strain at break in the X-Y axis of from about 4% to about 50%.

In addition to the examples described above, including the materials kits, the 3D printing systems, and the methods of manufacturing, features will be described in greater detail below. It is also noted, however, that when discussing the materials kits, the printing system, and/or the methods of manufacturing, these discussions can be considered applicable to the other examples, whether or not they are explicitly discussed in the context of that example. Thus, for example, in discussing a composite fiber related to a materials kit, such disclosure is also relevant to and directly supported in the context of the methods of manufacturing and printing systems described herein, and vice versa.

Materials Kits for 3D Printing

Figures 1, 2:
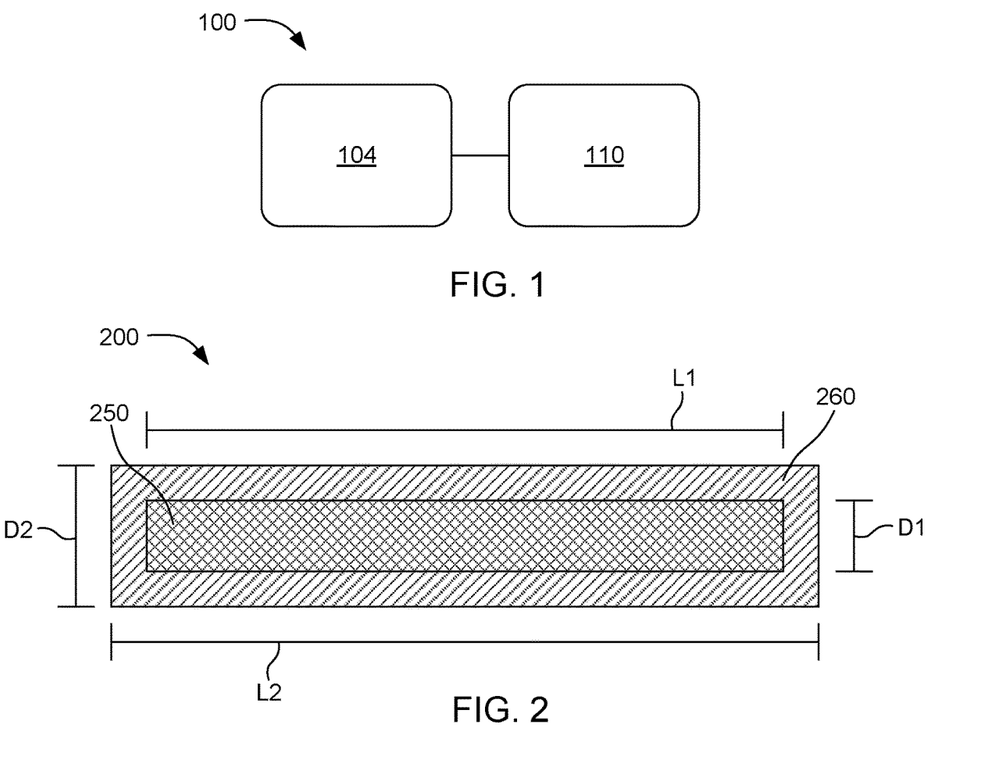
FIG. 1 is a schematic view of an example materials kit for 3D printing in accordance with the present disclosure.
FIG. 2 is a cross sectional view of an example composite fiber in accordance with the present disclosure.

With reference to the materials kits described herein, such materials kits for 3D printing can include build material and fluid agent(s). By way of example, FIG. 1 shows an example materials kit 100 for 3D printing that includes a powder bed material 104 and a fusing agent 110. In particular, the fusing agent can be selectively applied to the powder bed material and layers of the powder bed material can be fused to form a 3D printed article. In some examples, the materials kit for 3D printing can include powder bed material and a fusing agent packaged together. In certain examples, the powder bed material can be in the form of a container or bag of loose powder material. In other examples, the powder bed material can be in a cartridge designed to fit in a specific 3D printing system. Similarly, the fusing agent can be in a cartridge designed for use with a specific 3D printing system, or the fusing agent can be in another package, such as a bottle.

Powder Bed Material

Figure 3:
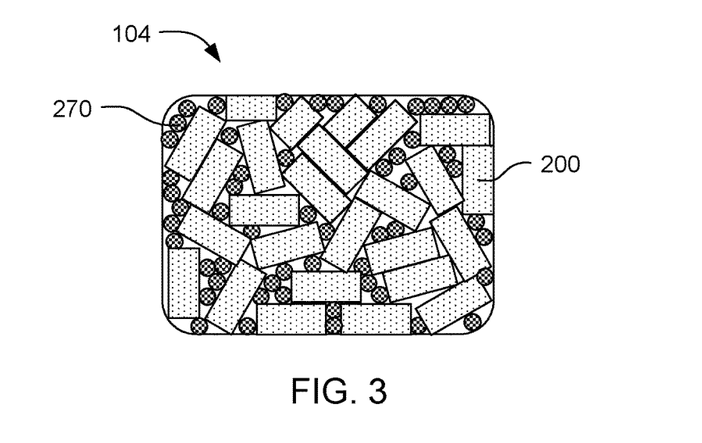
FIG. 3 is a schematic view of an example powder bed material for 3D printing in accordance with the present disclosure.

With respect to the materials kit for 3D printing, the 3D printing systems, and the methods of 3D printing examples herein, a powder bed material 104 can include composite fiber particles including from about 60 wt % to 100 wt % composite fibers including glass fibers coated with an encapsulating polymer. The composite fiber particles can have a length of from about 100 μm to about 700 μm and a diameter of from about 20 μm to about 70 μm.

The encapsulating polymer coating the glass fibers can typically be a polycrystalline polymeric material having a well-defined melting temperature and a well-defined recrystallization temperature. In some further examples, the encapsulating polymer can have a melting temperature of from about 100° C. to about 250° C. In some more specific examples, the encapsulating polymer can have a melting temperature of from about 100° C. to about 150° C., from about 125° C. to about 175° C., from about 150° C. to about 200° C., from about 175° C. to about 225° C., or from about 200° C. to about 250° C. In some non-limiting examples, the recrystallization temperature of the encapsulating polymer can be from about 5° C. to about 60° C., or from about 10° C. to about 50° C., lower than the melting temperature of the encapsulating polymer. Some non-limiting examples of encapsulating polymeric materials can include polyamide-12, polyamide-11, polyamide-6-13, polyamide-6, polypropylene, suitable elastomers (e.g., thermoplastic polyamide, thermoplastic polyurethane, etc.), the like, or a combination thereof. In some examples, the encapsulating polymer can be or include a polyamide. In some specific examples, the encapsulating polymer can be or include polyamide-12, polyamide-11, or a combination thereof. The encapsulating polymer can partially or fully encapsulate the substrate (e.g., glass fiber, inorganic filler particle, etc.), depending on the example.

Additionally, depending on the particular composite fibers employed, the composite fibers can be capable of being formed into 3D printed parts with a variety of resolutions. As used herein, "resolution" refers to the size of the smallest feature that can be formed on a 3D printed part. In some non-limiting examples, the powder bed material including the composite fiber particles can form layers from about 20 μm to about 100 μm thick, for example, allowing the fused layers of the printed article to have roughly the same thickness. Where this is the case, this can provide a resolution in the z-axis (i.e., depth) direction of about 20 μm to about 100 μm. In some examples, the composite fiber particles can have an average volumetric particle size distribution as follows: D10 particle size from about 25 μm to about 36 μm, or from about 20 μm to about 30 μm, D50 particle size from about 72 μm to about 87 μm, or from about 75 μm to about 85 μm, D90 particle size from about 170 μm to about 300 μm, or from about 200 μm to about 275 μm. Particle size distribution can be measured by laser diffraction, microscope imaging, or other suitable methodology. In some specific examples, the particle size distribution can be measured using a Malvern™ Mastersizer™, for example. This tool considers everything a sphere, so the rod-shaped composite fibers are reported based on their equivalent spherical volume, where the long dimension of the rod generally equals the diameter of the sphere.

In further detail, the composite fibers of the powder bed material 104 can be formed by coating glass fibers with an encapsulating polymer, such as polyamide-12 polymer. The glass fibers can generally have an average length from about 50 μm to about 300 μm. In other words, the individual lengths of the glass fibers employed in the powder bed material can be summed and divided by the number of glass fibers employed in the powder be material to arrive at the average length of glass fibers employed in the powder bed material. In some further examples, the glass fibers can have an average length of from about 50 μm to about 150 μm, about 100 μm to about 200 μm, about 150 μm to about 250 μm, or from about 200 μm to about 300 μm. The glass fibers can also generally have an average cross-sectional size or diameter (perpendicular to the elongated dimension of the glass fibers) from about 4 μm to about 20 μm. In other words, the individual diameters of the glass fibers employed in the powder bed material can be summed and divided by the number of glass fibers employed in the powder bed material to arrive at the average diameter of glass fibers employed in the powder bed material. In some further examples, the glass fibers can have an average diameter of from about 4 μm to about 8 μm, about 6 μm to about 12 μm, about 10 μm to about 14 μm, from about 12 μm to about 18 μm, or from about 14 μm to about 20 μm.

The glass fibers of the powder bed material 104 can have an organosilane coupling agent attached to the surface thereof. Organosilane coupling agents can facilitate coupling between the glass fibers and polymeric encapsulating materials. A variety of organosilane coupling agents can be employed. Non-limiting examples can include amino functional silane coupling agents, acrylate functional silane coupling agents, methacrylate functional silane coupling agents, epoxy functional silane coupling agents, ester functional silane coupling agents, the like, or a combination thereof.

When the glass fibers are coated with encapsulating material to form composite fibers as part of the powder bed material 104, the lengths and particularly the diameter of the fibers can be increased. For example, the average length of the composite fibers can generally be from about 100 μm to about 700 μm. In some other examples, the average length of the composite fibers can be from about 100 μm to about 300 μm, about 200 μm to about 400 μm, about 300 μm to about 500 μm, about 400 μm to about 600 μm, or from about 500 μm to about 700 μm. The average diameter of the composite fibers can generally be from about 20 μm to about 70 μm. In some specific examples, the average diameter of the composite fibers can be from about 20 μm to about 40

μm, about 30 μm to about 50 μm, about 40 μm to about 60 μm, or from about 50 μm to about 70 μm.

One example of a composite fiber 200 of the powder bed material (shown at 104 in FIGS. 1 and 3) is illustrated in FIG. 2. The composite fiber can include a glass fiber 250 encapsulated with an encapsulating polymer 260. The glass fiber can have a diameter D1 and a length L1. The composite fiber can have a diameter D2 and a length L2. Coating the glass fibers with an encapsulating polymer can also change the aspect ratio. For example, the average aspect ratio of the composite fibers can generally be from about 3:1 to about 30:1 length to diameter. In other words, the individual aspect ratios of the composite fibers employed in the powder bed material can be summed and divided by the number of composite fibers employed in the powder bed material to arrive at the average aspect ratio of glass fibers employed in the powder bed material. In some specific examples, the composite fibers can have an average aspect ratio of from about 3:1 to about 10:1, from about 5:1 to about 15:1, from about 10:1 to about 20:1, from about 15:1 to about 25:1, or from about 20:1 to about 30:1.

FIG. 3 shows an example of a powder bed material 104 for 3D printing. The powder bed material can include composite fibers 200. In some examples, the powder bed material can further include other powder bed particles 270 to increase the bulk density of the powder bed material or to add other functional properties to the 3D printed article. Thus, in some examples, the powder bed material can include from about 60 wt % to about 70 wt % composite fibers, from about 70 wt % to about 80 wt % composite fibers, from about 80 wt % to about 90 wt % composite fibers, or from about 90 wt % to about 100 wt % composite fibers. Other powder bed materials can include suitable inorganic fillers (e.g., glass fibers, glass beads, hollow glass, crushed glass, talc, mica, the like, or a combination thereof), suitable encapsulated glass beads or other inorganic fillers, suitable polymer particles (e.g., polyamide-12, polyamide-11, polyamide-6-13, polyamide-6, polypropylene, suitable elastomers (e.g., thermoplastic polyamide, thermoplastic polyurethane, etc.), the like, or a combination thereof.

As noted herein, and provided in further detail hereinafter, the composite fibers can be printed in combination with an energy absorber to fuse the composite fibers together to form a 3D printed article. Thus, the composite fibers can generally have a suitable bulk density and melt flow index (MFI) for forming a 3D printed article. For example, if the bulk density is too low, the 3D printed article can be poorly fused and have low tensile strength. Additionally, if the MFI is too low or too high, the composite fibers can be too viscous or insufficiently viscous to effectively fuse the 3D printed article when exposed to desired levels of electromagnetic radiation. Additionally, where the MFI is too high, the resulting 3D printed article can have poor ductility, poor mechanical properties, article defects, etc. Melt flow index measures the viscosity of the sample by customizing the force and temperature to which the sample is exposed. Thus, the composite fibers can generally have a bulk density of from about 0.18 grams per cubic centimeter (g/cc) to about 0.6 g/cc. In some specific examples, the composite fibers can have a bulk density of from about 0.18 g/cc to about 0.3 g/cc, from about 0.2 g/cc to about 0.4 g/cc, from about 0.3 g/cc to about 0.5 g/cc, or from about 0.4 g/cc to about 0.6 g/cc.

Additionally, the composite fibers can generally have a melt flow index (MFI) value of from about 10 to about 80 at a temperature of about 235° C. and a load of about 5 kilograms (kg). In some additional examples, the composite fibers can have an MFI value of from about 20 to about 50 at a temperature of about 235° C. and a load of about 5 kg. In some specific examples, the composite fibers can have an MFI value of from about 10 to about 30, from about 20 to about 40, from about 30 to about 50, from about 40 to about 60, from about 50 to about 70, or from about 60 to about 80 at a temperature of about 235° C. and a load of about 5 kg.

MFI can be measured using a variety of methods, such as ASTM D1238, for example. In one example, a quantity of about 20 cc to about 50 cc of composite fibers, depending on bulk density of the composite fibers, can be placed in a cylinder at a temperature of about 50° C. above the melting temperature of the encapsulating material (e.g., about 235° C. for polyamide-12). A weight of about 2.16 kilograms or 5 kilograms can be applied to the quantity of composite fibers within the cylinder and the amount of melted polymer that exits the bottom of the cylinder via a small orifice within 10 minutes can be quantified and used to determine the MFI value.

Fusing Agents

In further detail with respect to the materials kit, the 3D printing systems, and the methods of 3D printing examples herein, in addition to the powder bed material, there can also be a fusing agent including an energy absorber that is capable of absorbing electromagnetic radiation to produce heat. The energy absorber can be colored or colorless. In various examples, the energy absorber can be glass fiber, titanium dioxide, clay, mica, talc, barium sulfate, calcium carbonate, a near-infrared absorbing dye, a near-infrared absorbing pigment, a dispersant, a conjugated polymer, or combinations thereof. Examples of near-infrared absorbing dyes include aminium dyes, tetraaryldiamine dyes, cyanine dyes, pthalocyanine dyes, dithiolene dyes, and others. In further examples, the fusing agent can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the energy absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

A dispersant can be included in some examples. Dispersants can help disperse the energy absorbing pigments described above. In some examples, the dispersant itself can also absorb radiation. Non-limiting examples of dispersants that can be included as an energy absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctyl-phenyl ether, sodium polyacrylate, and combinations thereof.

The amount of energy absorber in the fusing agent can vary depending on the type of energy absorber. In some examples, the concentration of energy absorber in the fusing agent can be from about 0.1 wt % to about 20 wt %. In one example, the concentration of energy absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the energy absorber can have a concentration in the fusing agent such that after the fusing agent is printed onto the powder bed material, the amount of energy absorber in the powder bed material can be from about 0.0003 wt % to about 10 wt %, or from about 0.005 wt % to about 5 wt %, with respect to the weight of the powder bed material.

3D Printing Systems

Figure 4:
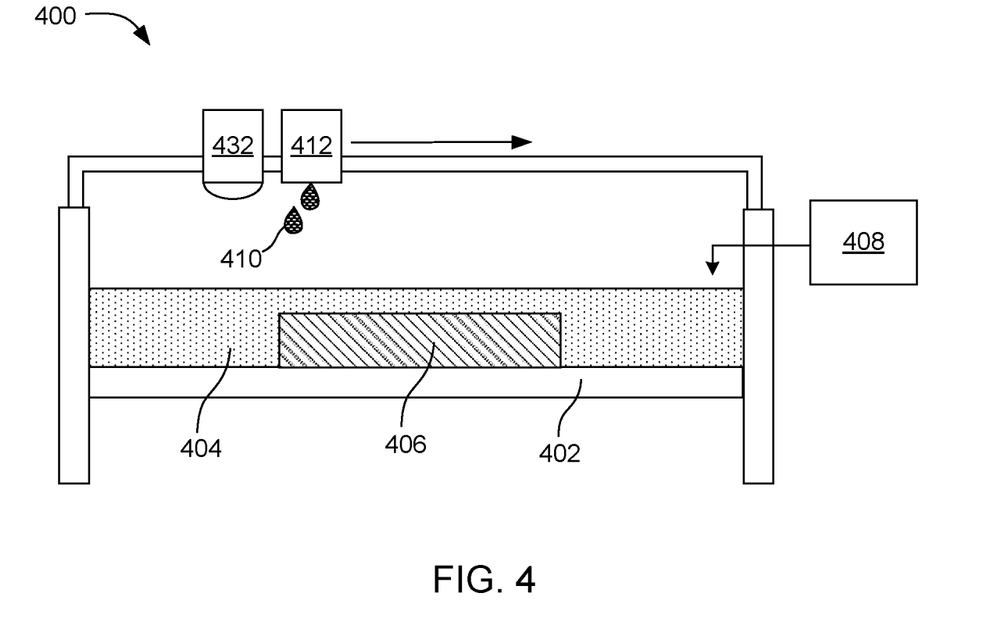
FIG. 4 is a schematic view of an example 3D printing system in accordance with the present disclosure.
Figure 5:
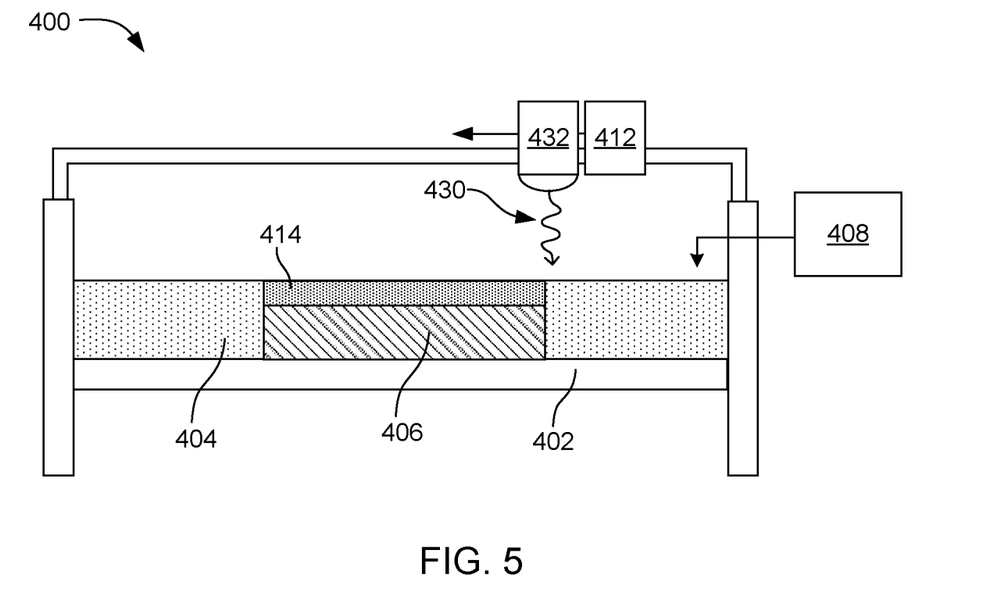
FIG. 5 is another schematic view of the example 3D printing system in accordance with the present disclosure.
Figure 6:
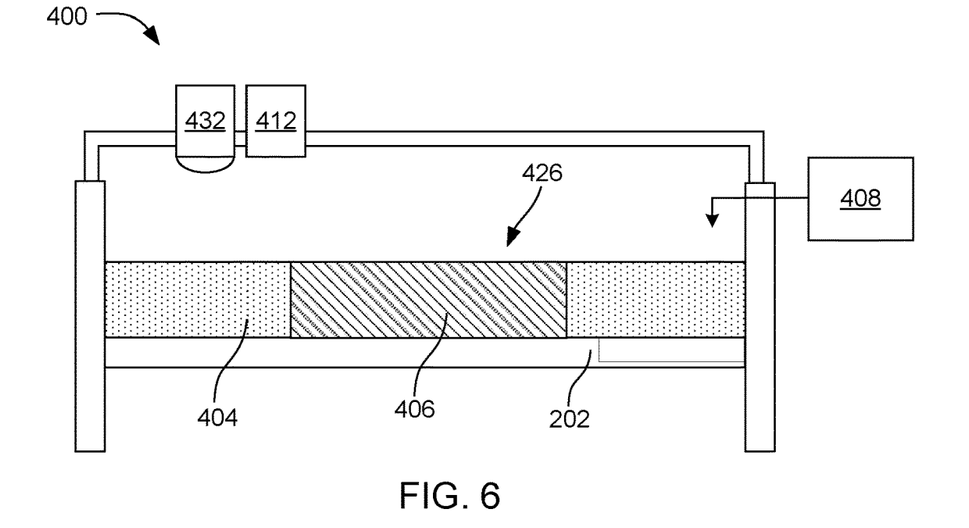
FIG. 6 is another schematic view of the example 3D printing system in accordance with the present disclosure.

FIGS. 4-6 illustrate an example 3D printing system in the context of a method of making a 3D printed article. For example, FIG. 4 shows a 3D printing system 400 that includes a build platform 402 supporting a powder bed material 404. The powder bed material can be as described previously, e.g., including from about 60 wt % to 100 wt % composite fibers including glass fibers coated with an encapsulating polymer. The composited fibers can have an average length of from about 100 μm to about 700 μm and an average diameter of from about 20 μm to about 70 μm. A partially printed article 406 is shown that is comprised or of fused powder bed material, which includes the composite fibers. This figure shows a cross-sectional view of the partially printed article and the powder bed material. In building the three-dimensional article, a layer of fresh build material powder is supplied from a build material supply 408 over the top of the partially printed article. Fusing agent 410 is then applied to the layer of fresh build material from a fusing agent ejector or jet 412. The fusing agent jet can be moveable within the printing system so that the fusing agent jet move across the powder bed to apply the fusing agent at specific locations based on a 3D object model. In this example, the 3D printing system can also include an electromagnetic energy source 432 to cause the powder bed material and the fusing agent to become fuse.

FIG. 5 shows the 3D printing system 400 after the fusing agent has been jetted onto portions of the fresh build material powder 404 and the newest uppermost layer 414 of build material has been fused using the fusing agent and the electromagnetic energy source. Generally, the fusing agent can be jetted in the areas where the powder bed material including the composite fibers (shown at 200 in FIG. 2) are in the process of becoming fused to form a solid article. The powder bed can be exposed to electromagnetic energy 430 from an energy source 432, such as an infrared lamp, to fuse the newest uppermost layer.

FIG. 6 shows the 3D printing system 400 after fusing newest uppermost layer to form the next iteration of the 3D printed article 406. This may be the completed 3D article, or can be an intermediate layer of the 3D article to which another layer of powder bed material and fusing agent can be applied to continue building the article.

As mentioned above, individual layers of the 3D printed article can be formed by fusing the powder bed material including the composite fiber particles. A fusing agent can be applied to the powder bed material in areas to be fused. 3D printing systems used to perform these printing methods can include an electromagnetic energy source to apply electromagnetic energy to fuse the powder bed material including the composite fiber particles printed with the fusing agent. In some cases, the energy source can be a lamp such as an infrared lamp.

Suitable fusing lamps for use in the 3D printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to fuse each printed layer. The fusing lamp can be configured to irradiate the entire powder bed with a substantially uniform amount of energy. This can selectively fuse the portions printed with the fusing agent while leaving the unprinted portions of the polymer powder below the fusing temperature.

In one example, the fusing lamp can be matched with the energy absorber in the fusing agent so that the source emits wavelengths of light that match the peak absorption wavelengths of the energy absorber. An energy absorber with a narrow peak at a particular near-infrared wavelength can be used with an electromagnetic radiation fusing source that emits a narrow range of wavelengths at approximately the peak wavelength of the fusing agent. Similarly, an energy absorber that absorbs a broad range of near-infrared wavelengths can be used with an electromagnetic radiation fusing source that emits a broad range of wavelengths. Matching the energy absorber and the electromagnetic radiation fusing source in this way can increase the efficiency of fusing the powder bed material including the composite fiber particles with the fusing agent printed thereon, while the unprinted powder bed material does not absorb as much light and remain at a lower temperature.

In some examples, the 3D printing system can also include preheaters for preheating the powder bed material including the composite fiber particles to a temperature near the fusing temperature. In one example, the system can include a print bed heater to heat the print bed during printing. The preheat temperature used can depend on the specific composite fiber used. In some examples, the print bed heater can heat the print bed to a temperature from about 50° C. to about 250° C. The print bed heater can also be employed to anneal the 3D printed article after formation. The system can also include a supply bed, where powder bed material including the composite fiber particles can be stored before being spread in a layer onto the print bed. The supply bed can have a supply bed heater. In some examples, the supply bed heater can heat the supply bed to a temperature from about 80° C. to about 140° C.

Depending on the amount of energy absorber present in the powder bed material including the composite fiber particles, the absorbance of the energy absorber, the preheat temperature, and the fusing temperature of the specific composite fiber, an appropriate amount of irradiation can be supplied from the electromagnetic energy source or fusing lamp. In some examples, the fusing lamp can irradiate each layer from about 0.1 seconds to about 10 seconds per pass. In further examples, the fusing lamp can move across the powder bed at a rate of about 1 inch per second to about 60 inches per second to fuse each layer. In still further examples, the fusing lamp can move across the powder bed at a rate of about 5 inches per second to about 20 inches per second.

Methods of Making 3D Printed Articles

In further detail regarding the methods of making 3D printed articles, in addition to the details provided previously with respect to the materials kits and the 3D printing systems, the 3D printing can be carried out by jetting a fusing agent onto layers of the powder bed material including the composite fibers described herein, along with fusing the powder bed material using electromagnetic energy.

Figure 7:
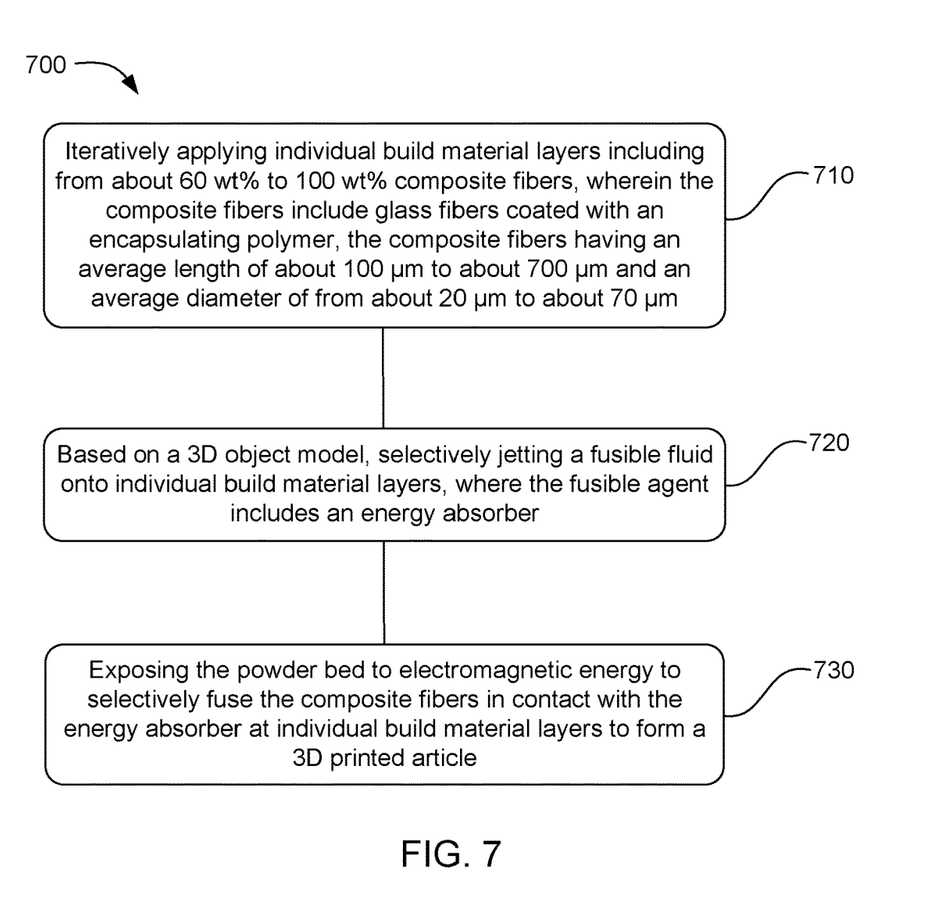
FIG. 7 is a flowchart illustrating an example method of making a 3D printed article in accordance with the present disclosure.

More specifically, FIG. 7 is a flowchart illustrating one example method 700 of making a 3D printed article. The method in this example includes iteratively applying 710 individual build material layers including from about 80 wt % to 100 wt % composite fibers, wherein the composite fibers include glass fibers coated with polyamide-12 polymer, the composite fibers having a length of about 100 μm to about 700 μm and a diameter of from about 20 μm to about 70 μm. In further detail, the method can include selectively jetting 720 a fusing agent including a fusing agent onto individual build material layers based on a 3D object model, and exposing 730 the powder bed to electromagnetic energy to selectively fuse the composite fibers in contact with the energy absorber at individual build material layers to form a 3D printed article.

As mentioned above, the 3D printed article can be formed by jetting a fusing agent onto layers of powder bed build material according to a 3D object model. 3D object models can in some examples be created using computer aided design (CAD) software. 3D object models can be stored in any suitable file format. In some examples, a 3D printed article as described herein can be based on a single 3D object model. The 3D object model can define the three-dimensional shape of the article and the three-dimensional shape of the area where the fusing agent is to be printed. Other information may also be included, such as structures to be formed of additional different materials or color data for printing the article with various colors at different locations on the article. The 3D object model may also include features or materials specifically related to jetting agents on layers of powder bed material, such as the desired amount of agent to be applied to a given area. This information may be in the form of a droplet saturation, for example, which can instruct a 3D printing system to jet a certain number of droplets of agent into a specific area. This can allow the 3D printing system to finely control radiation absorption, cooling, color saturation, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of powder bed material including the composite fibers can be spread on a bed to form a powder bed. At the beginning of the process, the powder bed can be empty because no powder bed material have been spread at that point. For the first layer, the powder bed material can be spread onto an empty build platform. The build platform can be a flat surface made of a material sufficient to withstand the heating conditions of the 3D printing process, such as a metal. Thus, "applying individual layers of powder bed material to a powder bed support" includes spreading powder bed material onto the empty build platform for the first layer. In other examples, a number of initial layers of powder bed material (including the composite fiber particles) or other polymer particle powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A printing head, such as an inkjet print head, can then be used to print a fusing agent including an energy absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The energy absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of powder bed material including the composite fiber particles can be spread over the powder bed and the process can be repeated to form additional layers until a complete 3D article is printed. Thus, "applying individual layers of powder bed material to a powder bed support" also includes spreading layers of powder bed material over the loose particles and fused layers beneath the new layer of powder bed material.

In some examples, the 3D printed article can be cured or annealed after printing. This can be accomplished in a number of ways. In some examples, the 3D printed article can be transferred to a curing or annealing oven after formation and maintained at a curing or annealing temperature for a designated period of time, depending on the specific composite fibers employed, the dimensions of the 3D printed article, etc. In other examples, the 3D printing system itself can be used to cure or anneal the 3D printed article. For example, the 3D printed article can be cured or annealed in a heated print bed or chamber of a 3D printing system. In some examples, the annealing process can be performed at a temperature of from about 140° C. to about 180° C. However, this can depend on the particular materials being employed. For example, it is noted that the annealing temperature can generally be lower than a melting temperature of the 3D printed article. For example, fresh polyamide-12 powder can have a melting temperature of about 187° C. However, after forming a 3D printed article with the polyamide-12, the 3D printed article can have a lower melting temperature of about 177° C. Thus, the annealing temperature can be lower than the melting temperature of the 3D printed article, rather than the powder bed material. In some examples, the annealing temperature can be from about 140° C. to about 160° C., from about 150° C. to about 170° C., from about 160° C. to about 175° C., or from about 170° C. to about 180° C. Where annealing is employed, the 3D printed article can generally be maintained at the annealing temperature for a period of from about 30 minutes to about 72 hours after formation of the 3D printed article. In some specific examples, the 3D printed article can be maintained at the annealing temperature for a period of from about 30 minutes to about 4 hours, from about 2 hours to about 10 hours, from about 8 hours to about 20 hours, from about 10 hours to about 30 hours, from about 20 hours to about 40 hours, from about 30 hours to about 50 hours, from about 40 hours to about 60 hours, or from about 50 hours to about 72 hours after formation of the 3D printed article. In other examples, the powder bed material can be pre-aged at an elevated temperature below the melting temperature of the powder bed material prior to forming the 3D printed part. In some examples, this process can be performed within the same temperature ranges described for the annealing process and for the same periods of time as the annealing process. However, the pre-aging process can be performed with the powder bed material prior to forming the 3D printed article.

In other examples, no curing or annealing process may be desirable. In such examples, the 3D printed article can be allowed to cool immediately following formation of the 3D printed article. Generally, this can be performed using a natural cooling process by allowing the 3D printed article to equilibrate to room temperature under ambient conditions. In other examples, an accelerated cooling process can be employed, such as via convective cooling, heat transfer fluids, refrigeration systems, the like, or a combination thereof.

It is further noted that the 3D printed articles using the composite fibers described herein and printed using the methods described herein can have a variety of material properties. For example, the 3D printed article can have a tensile strength in the X-Y axis of from about 25 megapascals (MPa) to about 65 MPa. In other examples, the 3D printed article can have a tensile strength in the X-Y axis of from about 25 MPa to about 45 MPa, from about 35 MPa to about 55 MPa, from about 45 MPa to about 65 MPa, from about 46 MPa to about 65 MPa, from about 50 MPa to about 65 MPa, or from about 55 MPa to about 65 MPa.

In additional examples, 3D printed articles using the composite fibers described herein and printed using the methods described herein can have a Young's modulus in the X-Y axis of from about 1600 MPa to about 4500 MPa. In some other examples, the 3D printed article can have a Young's modulus in the X-Y axis of from about 1600 MPa to about 2500 MPa, from about 2000 MPa to about 3000 MPa, from about 2500 MPa to about 3500 MPa, from about 3000 MPa to about 4000 MPa, from about 3500 MPa to about 4500 MPa, from about 3600 MPa to about 4500 MPa, or from about 4000 MPa to about 4500 MPa.

In still additional examples, 3D printed articles using the composite fibers described herein and printed using the methods described herein can have a strain at break (%) in the X-Y axis of from about 4% to about 50%. In some other examples, the 3D printed articles can have a strain at break (%) in the X-Y axis of from about 4% to about 15%, from about 10% to about 30%, from about 20% to about 40%, from about 30% to about 50%, or from about 40% to about 50%.

Definitions

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those in the field technology determine based on experience and the associated description herein.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also all the individual numerical values or sub-ranges encompassed within that range as if individual numerical values and sub-ranges are explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following are only exemplary or illustrative of the application of the principles of the presented materials kits and associated methods. Numerous modifications and alternatives may be devised without departing from the present disclosure. The appended claims are intended to cover such modifications and arrangements. Thus, while the disclosure has been provided with particularity, the following describes further detail in connection with what are presently deemed to be acceptable examples.

Example 1—Particle Size Distribution and Bulk Density of Composite Fiber Blends

Various blends of composite fibers were prepared and evaluated. Sample 1 included a 1:1 ratio of high aspect ratio composite fibers and low aspect ratio composite fibers. Sample 2 included 75 wt % high aspect ratio composite fibers and 25 wt % approximately spherical polymeric filler particles. Sample 3 included 90 wt % high aspect ratio composite fibers and 10 wt % approximately spherical polymeric filler particles. Sample 4 included 75 wt % low aspect ratio composite fibers and 25 wt % approximately spherical polymeric filler particles. Sample 5 included 75 wt % high aspect ratio composite fibers and 25 wt % approximately spherical polymeric filler particles. Sample 6 included a 1:1 ratio of high aspect ratio composite fibers and low aspect ratio composite fibers. Sample 7 also included a 1:1 ratio of high aspect ratio composite fibers and different low aspect ratio composite fibers.

The particle size distribution and bulk density of the different blends were evaluated. The volumetric particle size distribution for the blends was evaluated via laser diffraction using a Malvern™ Mastersizer™ 3000. The bulk density was measured by filling a tared 100 ml container with individual blends and measuring the mass of the blend within the 100 ml volume. The results are depicted below in Table 1:

TABLE 1

Sample Particle Size Distribution and Bulk Density

| Sample | D10 (by volume) | D50 (by volume) | D90 (by volume) | Bulk Density (g/cc) |
|---|---|---|---|---|
| 1 | 35.7 | 83.2 | 243 | 0.238 |
| 2 | 25.8 | 72.6 | 272 | 0.204 |
| 3 | 27.5 | 75.4 | 239 | 0.189 |
| 4 | 32.9 | 72.3 | 179 | 0.358 |
| 5 | 26.1 | 69.1 | 235 | 0.219 |
| 6 | 35.8 | 82.9 | 236 | 0.238 |
| 7 | 35.7 | 86.2 | 236 | 0.238 |

Example 2—Mechanical Properties of the Blends

Figure 8A:
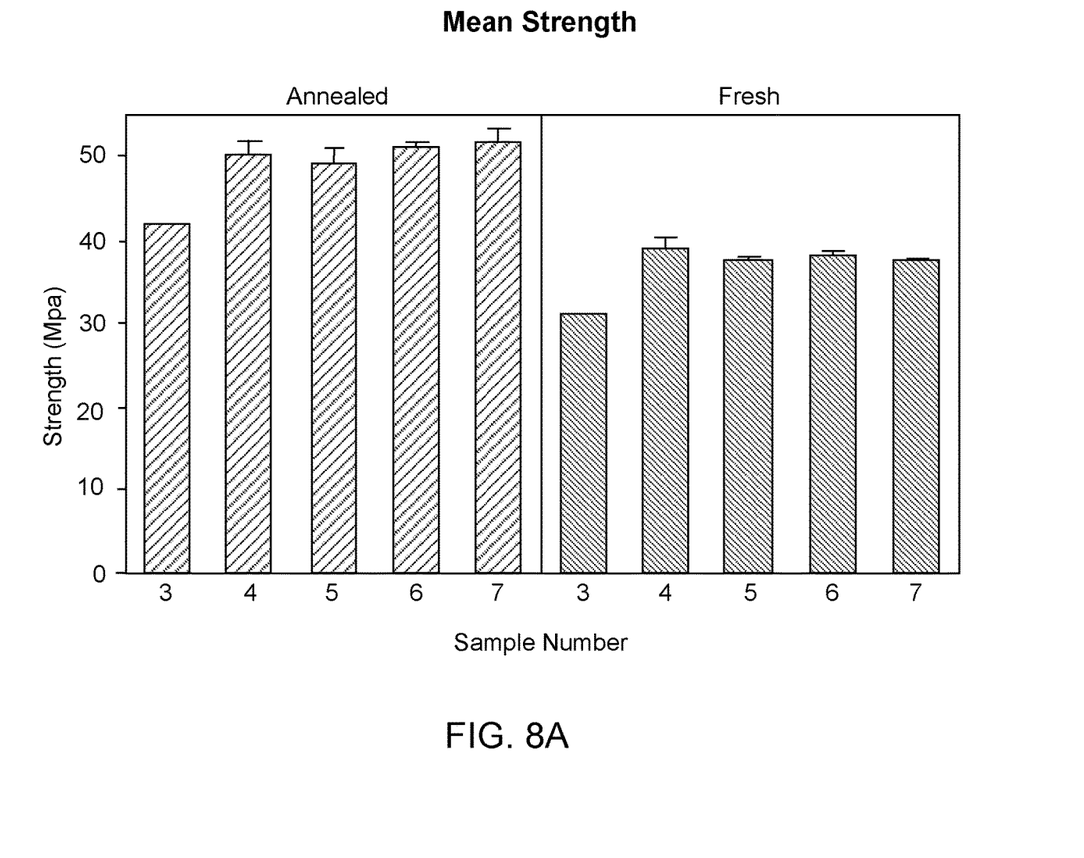
FIG. 8A is a graph of tensile strength in accordance with the present disclosure.
Figure 8B:
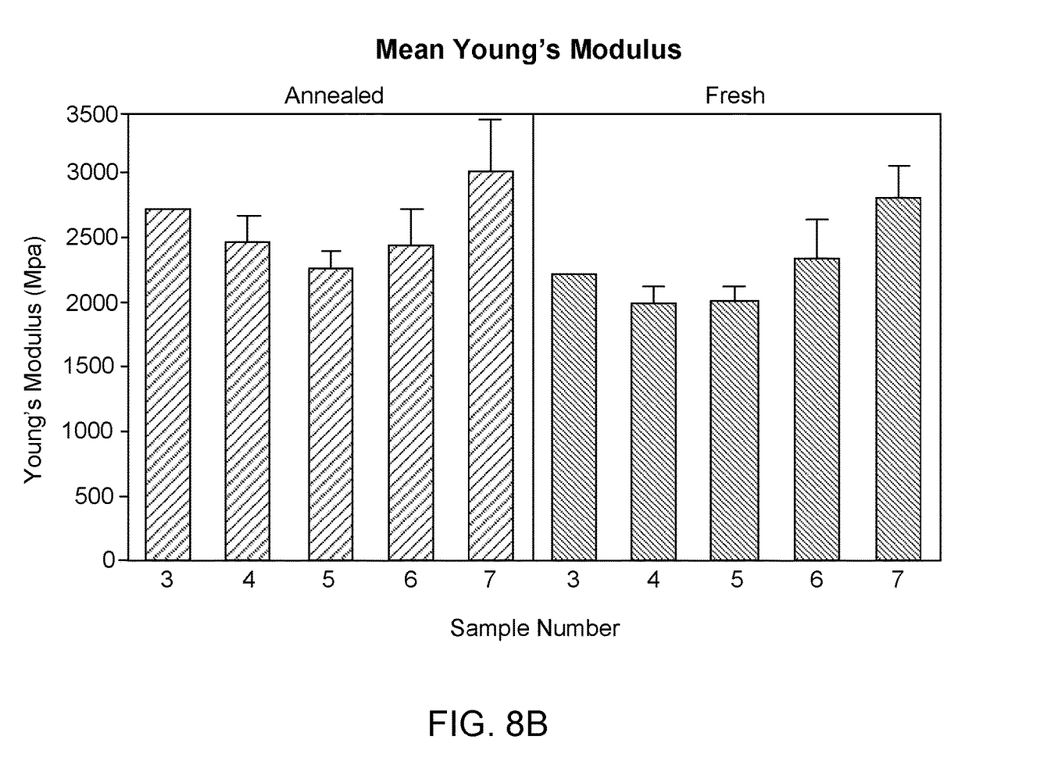
FIG. 8B is a graph of Young's modulus in accordance with the present disclosure.
Figure 8C:
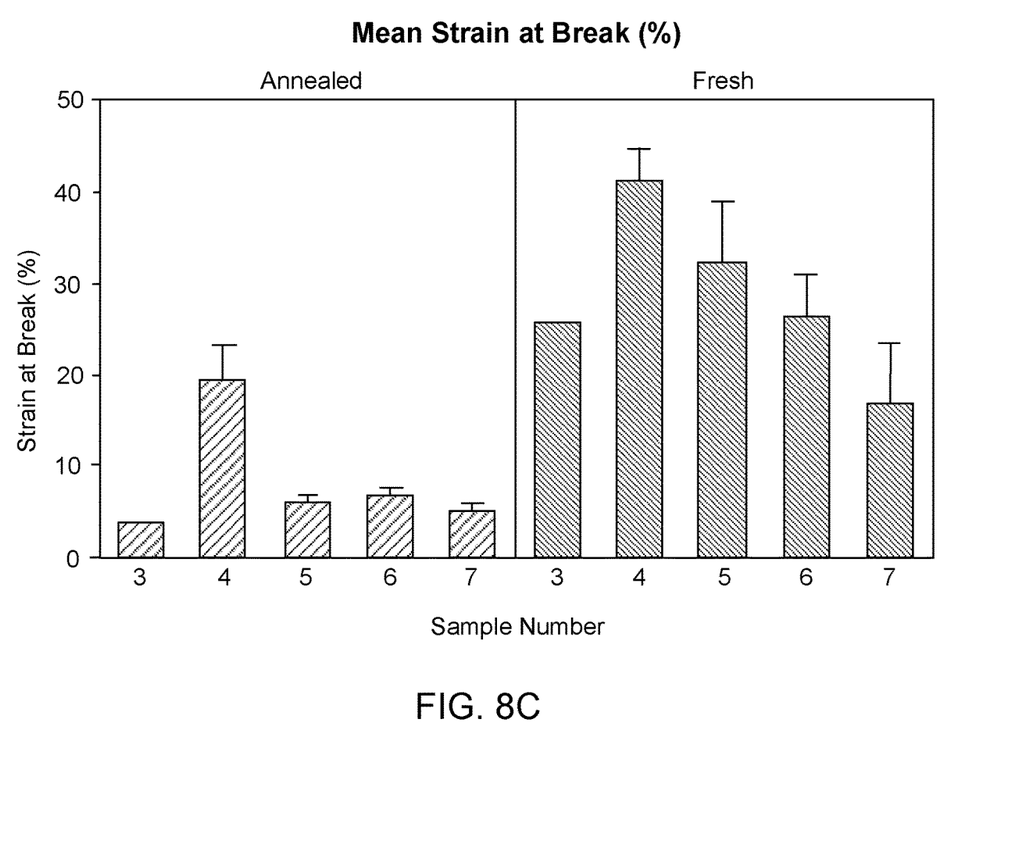
FIG. 8C is a graph of strain at break (%) in accordance with the present disclosure.

Some of the blends described in Example 1 were printed and tested to evaluate the mechanical properties of the 3D printed articles. Specifically, ultimate tensile strength, Young's modulus, and strain at break (%) were evaluated using Type V specimens defined in ASTM D638. However, due to the constraints of the printing system employed, the lengths of the 3D printed articles ranged from about 45.5 mm to about 63.5 mm. The width for the region of interest was 3.18 mm and the thickness of the region of interest was 4 mm. Also, due to a limited amount of powder material, data for the 3D printed articles was only collected in the XY direction. 3D printed parts were divided into two groups: 1) Annealed; and 2) Fresh. The 3D printed parts in the "Annealed" group were moved to an oven to age for 20 hours at 165° C. The 3D printed parts in the "Fresh" group were allowed to immediately equilibrate to room temperature at ambient conditions. FIG. 8A depicts the ultimate tensile strength of the Annealed and Fresh 3D printed articles. FIG. 8B depicts the Young's modulus of the Annealed and Fresh 3D printed articles. FIG. 8C depicts the strain at break (%) of the Annealed and Fresh 3D printed articles.

As can be seen from the results depicted in FIGS. 8A-8C, the 3D printed articles had an ultimate tensile strength ranging from about 27 MPa to about 54 MPa, a Young's modulus ranging from about 1600 MPa to about 3600 MPa, and a strain at break from about 4% to about 47%. Each of these values depended on the type of material used, as well as the printing/cooling conditions employed.

While the data is not shown, the mechanical properties of 3D printed articles prepared from the blends of composite fibers described herein were compared with the mechanical properties of 3D printed articles prepared from encapsulated glass beads. Based on the samples tested, the 3D printed articles prepared from composite fiber blends consistently had higher ultimate tensile strength, higher Young's modulus, and lower strain at break (%) than equivalent 3D printed articles formed with encapsulated glass bead blends.

While the present technology has been described with reference to certain examples, various modifications, changes, omissions, and substitutions can be made without departing from the spirit of the disclosure. It is intended, therefore, that the disclosure be limited only by the scope of the following claims.

What is claimed is:

1. A materials kit for 3D printing, the materials kit comprising:
  a powder bed material comprising from about 60 wt % to 100 wt % of composite fibers including glass fibers coated with an encapsulating polymer, wherein the composite fibers have an average length of from about 100 μm to about 700 μm, an average diameter of from about 20 μm to about 70 μm, and an average aspect ratio of from about 3:1 to about 30:1; and
  a fusing agent comprising an energy absorber to absorb electromagnetic radiation to produce heat.

2. The materials kit of claim 1, wherein the composite fibers include glass fibers having an average length of from about 50 μm to about 300 μm and an average diameter of from about 4 μm to about 20 μm.

3. The materials kit of claim 1, wherein the composite fibers have a bulk density of from about 0.18 g/cc to about 0.6 g/cc.

4. The materials kit of claim 1, wherein the composite fibers have a melt flow index value of from about 10 to about 80 at a temperature of 235° C. and a load of 5 kg.

5. The materials kit of claim 1, wherein the composite fibers have a volumetric particle size distribution of:
  a D10 of from about 25 μm to about 36 μm;
  a D50 of from about 72 μm to about 87 μm; and
  a D90 of from about 170 μm to about 300 μm.

6. The materials kit of claim 1, wherein the energy absorber comprises a carbon black pigment, a near-infrared absorbing dye, a near-infrared absorbing pigment, a tungsten bronze, a molybdenum bronze, metal nanoparticles, a conjugated polymer, or a combination thereof.

7. The materials kit of claim 1, wherein the encapsulating polymer includes polyamide-12, polyamide-11, polyamide-6-13, polyamide-6, polypropylene, thermoplastic polyamide, thermoplastic polyurethane, or a combination thereof.

8. A materials kit for 3D printing, the materials kit comprising:
  a powder bed material comprising from about 60 wt % to 100 wt % of composite fibers including glass fibers coated with an encapsulating polymer, wherein the composite fibers have an average length of from about 100 μm to about 700 μm and an average diameter of from about 20 μm to about 70 μm; and
  a fusing agent comprising an energy absorber to absorb electromagnetic radiation to produce heat;
  wherein the glass fibers include an organosilane coupling agent attached to a surface of the glass fibers.

9. The materials kit of claim 8, wherein the composite fibers have an average aspect ratio from about 3:1 to about 30:1.

10. A 3D printing system, comprising:
  a powder bed material including from about 60 wt % to about 100 wt % of composite fibers including glass fibers coated with an encapsulating polymer, wherein the composite fibers have an average length of from about 100 μm to about 700 μm, an average diameter of from about 20 μm to about 70 μm, and an average aspect ratio of from about 3:1 to about 30:1;
  a fusing agent to eject onto the powder bed material, wherein the fusing agent comprises an energy absorber capable of absorbing electromagnetic radiation to produce heat; and
  a fusing electromagnetic radiation source to expose the powder bed material to electromagnetic radiation to fuse composite fibers that have been contacted by the fusing agent via ejection, and does not fuse the composite fibers not contacted by the fusing agent.

11. The system of claim 10, wherein the composite fibers include from about 10 wt % to about 40 wt % of the glass fibers based on a total weight of the composite fibers.

12. A method of making a 3D printed article using the materials kit of claim 1, the method comprising:
- iteratively applying individual build material layers of the powder bed material in a powder bed;
- based on a 3D object model, selectively jetting the fusing agent onto the individual build material layers; and
- exposing the powder bed to electromagnetic energy to selectively fuse the composite fibers in contact with the energy absorber at the individual build material layers to form the 3D printed article.

13. The method of claim 12, further comprising maintaining the 3D printed article at a temperature of from about 140° C. to about 180° C. for a period of from about 30 minutes to about 72 hours after formation of the 3D printed article.

14. The method of claim 12, further comprising allowing the 3D printed article to cool immediately following formation of the 3D printed article.

15. The method of claim 12, wherein the 3D printed article has a tensile strength in the X-Y axis of from about 25 MPa to about 65 MPa, a Young's modulus in the X-Y axis of from about 1600 MPa to about 4500 MPa, and a strain at break in the X-Y axis of from about 4% to about 50%.

* * * * *